(12) United States Patent
Ohtomo

(10) Patent No.: US 7,539,670 B2
(45) Date of Patent: *May 26, 2009

(54) DATA SEARCH SYSTEM AND METHOD FOR DISPLAYING DATA SEARCH RESULTS

(75) Inventor: Yasuo Ohtomo, Tokyo (JP)

(73) Assignee: Beacon International Technology Inc., Tokyo (JP)

( * ) Notice: Subject to any disclaimer, the term of this patent is extended or adjusted under 35 U.S.C. 154(b) by 574 days.

This patent is subject to a terminal disclaimer.

(21) Appl. No.: 11/122,675

(22) Filed: May 5, 2005

(65) Prior Publication Data

US 2005/0222993 A1 Oct. 6, 2005

Related U.S. Application Data

(63) Continuation of application No. 10/091,856, filed on Mar. 6, 2002, now Pat. No. 6,910,031.

(30) Foreign Application Priority Data

Mar. 7, 2001 (JP) .............................. 2001-64152

(51) Int. Cl.
G06F 17/30 (2006.01)
G06F 7/00 (2006.01)
(52) U.S. Cl. ......................................... 707/3; 345/440
(58) Field of Classification Search .................. 707/3, 707/E17.093; 345/440
See application file for complete search history.

(56) References Cited

U.S. PATENT DOCUMENTS

| 5,515,488 A | * | 5/1996 | Hoppe et al. ................. 345/440 |
| 5,592,663 A | | 1/1997 | Nagamori |
| 6,529,916 B2 | * | 3/2003 | Bergman et al. ........... 707/104.1 |
| 2003/0140059 A1 | * | 7/2003 | Ishizaka ................. 707/103 R |
| 2003/0197933 A1 | * | 10/2003 | Sudo et al. .................. 359/464 |
| 2004/0001060 A1 | * | 1/2004 | Stollnitz et al. ............. 345/423 |

FOREIGN PATENT DOCUMENTS

| JP | 5-81431 | 4/1993 |
| JP | 06-044113 | 2/1994 |
| JP | 06-266778 | 9/1994 |
| JP | 3357665 | 10/2002 |

OTHER PUBLICATIONS

Official Action in Japan dated Jun. 4, 2002 with its translation.

* cited by examiner

*Primary Examiner*—Pierre M Vital
*Assistant Examiner*—Sabana. Rahman.
(74) *Attorney, Agent, or Firm*—Dobrusin & Thennisch PC

(57) ABSTRACT

In a data search system, a user interface is implemented which can present results of data search in a human-recognizable fashion. The data search system includes an image processing unit for displaying a data search result based on a certain search criterion, as a set per search criterion, as well as converting each set into a polygonal Venn diagram, e.g. a dodecagon, having an area corresponding in magnitude to the number of elements in each set. The system also includes a display control unit for causing each Venn diagram to be displayed on a predetermined display device. Each of the multiple Venn diagrams is displayed on the same display screen while keeping its relative relationship with other Venn diagrams based on their search criteria.

14 Claims, 7 Drawing Sheets

TOKYO RESIDENT ∩ M̄ĀL̄Ē ∩ C̄ŌN̄T̄R̄ĀC̄T̄ Ȳ̄ĒĀR̄S̄ ŌF̄ 3 ŌR̄ L̄ŌN̄ḠĒR̄:   300 HITS

T̄ŌK̄Ȳ̄Ō R̄ĒS̄ĪD̄ĒN̄T̄ ∩ MALE ∩ C̄ŌN̄T̄R̄ĀC̄T̄ Ȳ̄ĒĀR̄S̄ ŌF̄ 3 ŌR̄ L̄ŌN̄ḠĒR̄:   500 HITS

T̄ŌK̄Ȳ̄Ō R̄ĒS̄ĪD̄ĒN̄T̄ ∩ M̄ĀL̄Ē ∩ CONTRACT YEARS OF 3 OR LONGER:   200 HITS

TOKYO RESIDENT ∩ MALE ∩ C̄ŌN̄T̄R̄ĀC̄T̄ Ȳ̄ĒĀR̄S̄ ŌF̄ 3 ŌR̄ L̄ŌN̄ḠĒR̄:   100 HITS

TOKYO RESIDENT ∩ M̄ĀL̄Ē ∩ CONTRACT YEARS OF 3 OR LONGER:   200 HITS

T̄ŌK̄Ȳ̄Ō R̄ĒS̄ĪD̄ĒN̄T̄ ∩ MALE ∩ CONTRACT YEARS OF 3 OR LONGER:   300 HITS

TOKYO RESIDENT ∩ MALE ∩ CONTRACT YEARS OF 3 OR LONGER:   100 HITS

FIG. 3(a)

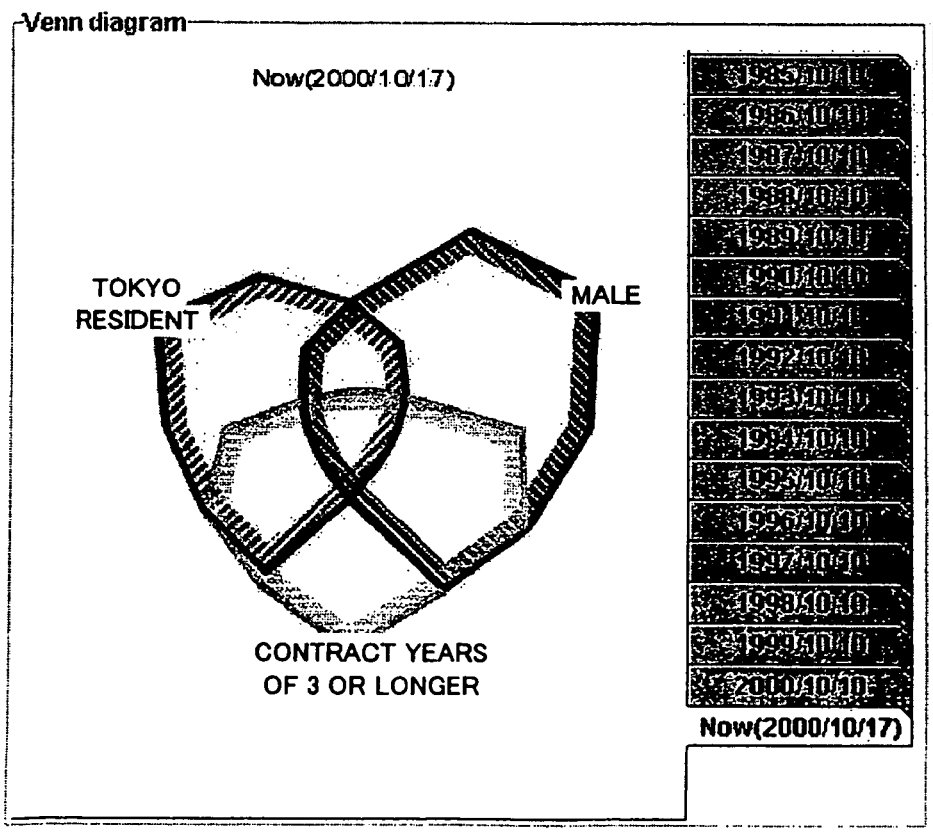

FIG. 3(b)

TOKYO RESIDENT ∩ M̄ĀL̄Ē ∩ C̄ŌN̄T̄R̄ĀC̄T̄ ȲĒĀR̄S̄ ŌF̄ 3̄ ŌR̄ L̄ŌN̄ḠĒR̄:   200 HITS

T̄ŌK̄ȲŌ R̄ĒS̄ĪD̄ĒN̄T̄ ∩ MALE ∩ C̄ŌN̄T̄R̄ĀC̄T̄ ȲĒĀR̄S̄ ŌF̄ 3̄ ŌR̄ L̄ŌN̄ḠĒR̄:   350 HITS

T̄ŌK̄ȲŌ R̄ĒS̄ĪD̄ĒN̄T̄ ∩ M̄ĀL̄Ē ∩ CONTRACT YEARS OF 3 OR LONGER:   150 HITS

TOKYO RESIDENT ∩ MALE ∩ C̄ŌN̄T̄R̄ĀC̄T̄ ȲĒĀR̄S̄ ŌF̄ 3̄ ŌR̄ L̄ŌN̄ḠĒR̄:   150 HITS

TOKYO RESIDENT ∩ M̄ĀL̄Ē ∩ CONTRACT YEARS OF 3 OR LONGER:   200 HITS

T̄ŌK̄ȲŌ R̄ĒS̄ĪD̄ĒN̄T̄ ∩ MALE ∩ CONTRACT YEARS OF 3 OR LONGER:   100 HITS

TOKYO RESIDENT ∩ MALE ∩ CONTRACT YEARS OF 3 OR LONGER:   80 HITS

FIG. 5(a)

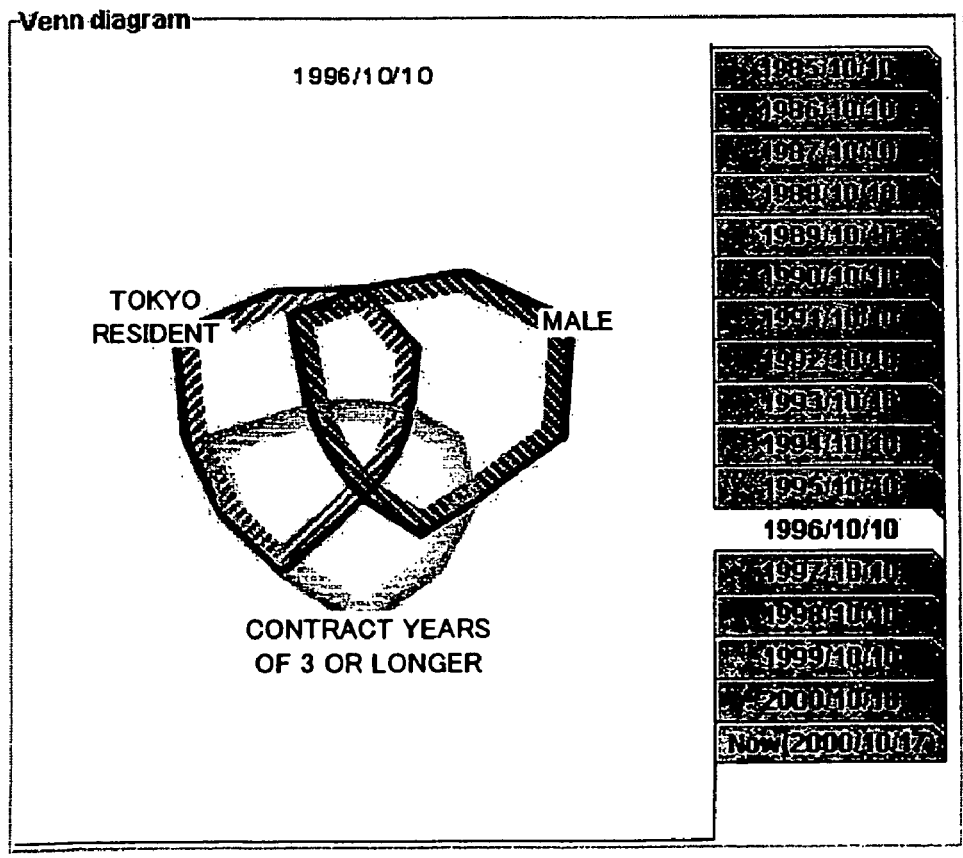

FIG. 5(b)

| | | | |
|---|---|---|---|
| SET A ∩ $\overline{\text{SET B}}$ ∩ $\overline{\text{SET C}}$: | 1 HIT |
| $\overline{\text{SET A}}$ ∩ SET B ∩ $\overline{\text{SET C}}$: | 1 HIT |
| $\overline{\text{SET A}}$ ∩ $\overline{\text{SET B}}$ ∩ SET C: | 1 HIT |
| SET A ∩ SET B ∩ $\overline{\text{SET C}}$: | 10 HITS |
| SET A ∩ $\overline{\text{SET B}}$ ∩ SET C: | 10 HITS |
| $\overline{\text{SET A}}$ ∩ SET B ∩ SET C: | 10 HITS |
| SET A ∩ SET B ∩ SET C: | 0 HITS |

DATA SEARCH SYSTEM AND METHOD FOR DISPLAYING DATA SEARCH RESULTS

"This application is a continuation of Ser. No. 10/091,856, which was filed on Mar. 6, 2002, which claims the benefit of Japanese Patent Application number 2001-64152 filed Mar. 7, 2001. This application claims the benefit of the filing dates of both the aforementioned previously filed applications."

FIELD OF THE INVENTION

The present invention relates, in general, to a data search system for managing, as sets, data search results based on search criteria, and, more specifically, to a user interface scheme for visually representing data search results.

BACKGROUNG OF THE INVENTION

Results of data search through a database may be represented as a set according to each search criterion, and the size or magnitude of the set is often represented as a numerical value. The user may use this numerical value to intuitively understand the size of the set. However, as there is more than one search criterion and the resulting sets become complicated accordingly, it could become difficult to recognize the relationship in size or magnitude among those sets, relevancy of the search criteria, and so on, merely by way of numerical values.

In order to provide improvement on this aspect, data management systems are traditionally available such that the size of the set is visually represented. They include, for example, a data management system that employs a technique by which a set is represented by a rectangular or circular Venn diagram determined by calculation of a geometric formula.

However, even with such a data management system, if multiple Venn diagrams exist, it is difficult to display them within the same display region, while maintaining a relative relationship of each Venn diagram with one another, and it may become impossible to do so depending on the search criteria or the size of the set or product set. For example, it is impossible to display three sets as shown in FIG. 8 (sets A, B, and C) within the same display region as rectangular or circular Venn diagrams, while retaining a relative relationship of each set.

Additionally, there may be cases where in addition to Venn diagrams created under certain search criteria, one may want to create new Venn diagrams with other criteria, such as time and territory, partially added and compare them with one another, but such processing could not be achieved with conventional data management systems.

Thus, it is an objective of the present invention to provide a data search system and a method for displaying data search results that can overcome such shortcomings.

It is another objective of the present invention to provide a computer program and storage medium that may allow a computer to function as such a data search system.

SUMMARY OF THE INVENTION

A data search system according to the present invention comprises a data acquisition means for acquiring results of a data search based on certain search criteria; an image processing means for representing, as a set for each of the search criteria, the results of the data search acquired by the data acquisition means and converting each set to an n-polygonal image having an area corresponding to the magnitude of element count of each set; and a display control means for causing each n-polygonal image converted by the image processing means to be displayed on a predetermined display device, wherein each of the multiple n-polygonal images is displayed within the same display region while maintaining a relative relationship with other n-polygonal images based on the search criteria.

An element of a set is an element for quantitatively representing the magnitude of the set, such as, for example, a numerical value "n" is a natural number, which is usually 5 or greater, and, more preferably, about 12 to 24. This value is a numerical value that may be changed a posteriori, depending on the magnitude of the set, the number of other n-polygonal images, or their relative relationships.

To enable a relationship among search criteria to be visually recognized in accordance with the display positions of the n-polygonal images, each of the sets is converted to an n-polygonal image having an area corresponding to the magnitude of element count of each set and a relative relationship in position based on the search criteria. A result of a data search obtained by a Boolean AND operation of search criteria is represented by an overlap of the n-polygonal images converted from the respective sets for the search criteria.

The shape and area of an n-polygon that is predicated on the n-polygonal image may be identified by arithmetic operation. For example, it is derived by repeating a convergent calculation for drawing under certain restricting parameters. In that case, the convergent calculation is initiated under restricting parameters where a convex polygon appears, and the restricting parameters are switched to such parameters that a concave polygon appears if it does not converge as a convex polygon even after it is repeated a predetermined number of times.

The image processing means identifies the shape of the n-polygonal image (or position of each vertex) by use of a radius and argument of polar coordinates, and calculates the area, S, of the n-polygonal image by use of an operational expression having the radius, γ, and n, as its variables. More specifically, assuming that the radius of the polar coordinates is γi where i is an integer greater than zero and not greater than n), then the argument, θi, of the polar coordinates is expressed as (2π/n)·i, as is well known, so that the area, Si, of the n-polygonal image may be determined by the following equation:

$$Si = \frac{1}{2}\sin\frac{2\pi}{n}\sum_{i=0}^{n-1} r_i r_{i+1} \tag{1}$$

If a plurality of sets contain any product set determined by a Boolean AND operation, the area Si of that product set is derived as a result of convergent calculation for increase or decrease in the radius γi.

For applications where changes in time frame for certain search criteria are to be ascertained, the data search system further comprises an image storage means for storing n-polygonal images converted as the data search results where only a portion of the search criteria differs, according to the search criteria that are commonly shared by the rest. In that case, the image processing means causes multiple n-polygonal images that vary with changes in a portion of the search criteria to be displayed within the same display region.

As described above, if the shape of the n-polygonal image is identified by the radius γi and argument θi of the polar coordinates and the area Si of that n-polygonal image is calculated by the operational expression having the radius γi and n as its variables, the image processing means places in the same position the poles of said polar coordinates and their initial lines for a plurality of n-polygonal images displayed within the same display region.

The method of present invention includes a method for displaying a data search result is such that a result of data search based on certain search criteria is represented as a set according to each of said search criteria, and each set is converted to an n-polygonal image having an area corresponding to the magnitude of element count of each set and a relative relationship in position among the search criteria, so that when each n-polygonal image converted is displayed on a predetermined display device, each of the multiple n-polygonal images is displayed within the same display region, while maintaining a relative relationship with other n-polygonal images based on the search criteria.

The present invention also provides a computer program in a computer that conducts a data search based on certain search criteria. The said computer comprises a data acquisition means for acquiring results of data search based on the search criteria; an image processing means for representing the search results acquired by the data acquisition means as sets according to each of the search criteria, and converting each set to an n-polygonal image having an area corresponding to the magnitude of element count of each set and a relative relationship in position among the search criteria; and a display control means for causing a predetermined display device to display each of the n-polygonal images converted by the image processing means, wherein the computer program causes each of the n-polygonal images to be displayed within the same display region while maintaining a relative relationship with other n-polygonal images based on the search criteria.

The computer program is typically embodied by being stored in a computer-readable storage medium, such as CD-ROM or DVD-ROM.

These and other objects of the present invention will become apparent upon reading the following detailed description in combination with the accompanying drawings, which depict systems and components that can be used alone or in combination with each other in accordance with the present invention.

BRIEF DESCRIPTION OF THE DRAWINGS

FIG. 3(a) depicts an example of data search results for search criteria used in the present embodiment, and FIG. 3(b) depicts an example of Venn diagrams presented on a client display based on the above data search results;

FIG. 5(a) depicts the same search criteria as in FIG. 3(a) and past data search results, and FIG. 5(b) depicts an example of Venn diagrams presented on a client display based on the above data search results;

DETAILED DESCRIPTION OF A PREFERRED EMBODIMENT

An embodiment of the present invention is described below where the mechanism of the present invention is applied to a network-based database management system.

Figure 1:
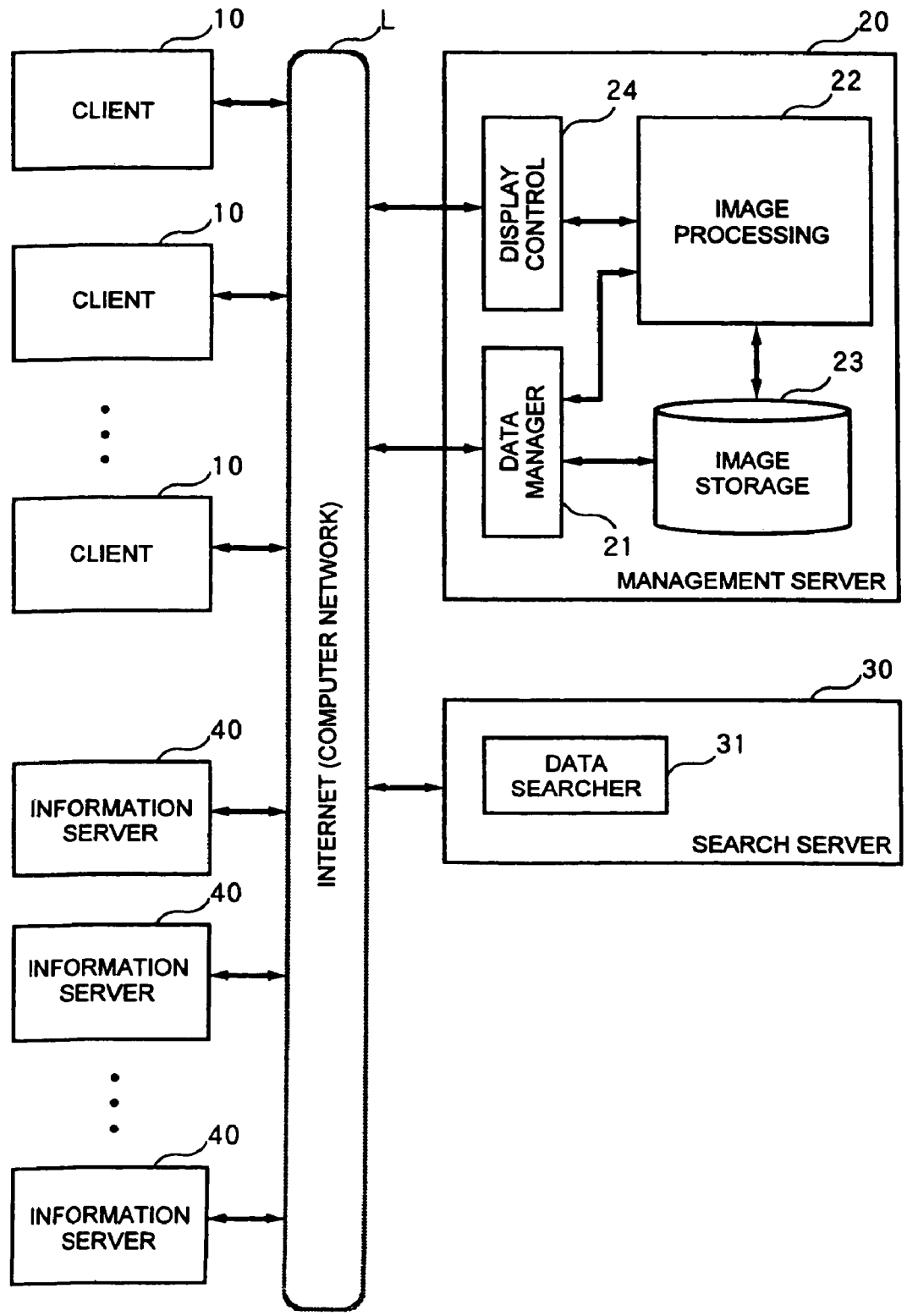
FIG. 1 is a schematic diagram of a data search system according to the present invention.

With reference to FIG. 1, a database management system comprises a management server 20 that forms an example of the data search system, and a search server 30, both connected to a computer network L. In this embodiment, it is contemplated that the computer network L is the Internet, to which clients 10 manipulated by users and various information servers 40 are connected.

The client 10 is a general-purpose computer terminal having communication capability for conducting bi-directional communication with the Internet L and display capability for presenting contents on a display, and also incorporates a browser. The client 10 makes a request for data search to the management server 20 via the Internet L and presents results of the data search on the browser. To the request for data search are attached search criteria.

The management server 20 and search server 30 are computers having Web server capabilities that are accessible to the Internet L, and implement required functions related to data search and display of search results, in addition to the Web server capabilities, in cooperation with hardware resources and computer programs. More specifically, the search server 30 implements the capability of conducting a data search to the information server 40, and the management server 20 implements functions of a data manager unit 21, an image processing unit 22, an image storage unit 23, and a display control unit 24.

These functions are each realized by cooperation between the computer programs stored in a computer-readable storage medium and the hardware resources of the server that reads them.

By way of example, the management server 20 and search server 30 are configured as separate servers, although it will be appreciated that they may be implemented as a single server system.

The data manager unit 21 of the management server 20 stores a HTML page for presentation on the browser of the client 10 and a CGI script for activating the search server. It invokes the CGI script by acquiring a data search request and search criteria from the client 10 via the HTML page, and this CGI script is used to activate the search server. The CGI script obtains from the search server 30 a HTML image that represents the data search result, and temporarily stores it in a buffer area within the management server 20.

The image processing unit 22, which is intended to perform the process of displaying a characteristic data search result, displays, as a set according to each search criterion, a data search result obtained corresponding to a certain search criterion, and converts each set to a Venn diagram that is an n-polygonal image having an area corresponding to the magnitude of element count of each set. Elements of a set may include ones that can represent a relative relationship in magnitude, i.e., a numerical value, such as data count, for example.

For data search results based on Boolean AND operation of search criteria or other logic conditions, they are represented by overlaps of the Venn diagrams converted by the respective sets of the search criteria.

Greater detail of the above processing is described herein below.

The image storage unit 23 stores n-polygonal Venn diagrams for the respective search criteria, so that they may be read out using any of the search criteria as a key. When the search time frame, such as the search date, is contained as one of the search criteria, Venn diagrams based on all search criteria by search date are stored. In that case, using the search date as a key, all the relevant Venn diagrams can be read out. Additionally, Venn diagrams where only a portion of the search criteria is different may be stored according to each of the remaining search criteria, so that they may be read out using the remaining search criteria as keys.

The display control unit 24 performs control to allow the browser of the client 10 to display each of the Venn diagrams drawn by the image processing unit 23, together with items and so forth for displaying these Venn diagrams.

The procedures executed by the image processing unit 22 are described in detail below.

It is presumed that the magnitude of a set that is a data search result is all represented by a numerical value in the form of hit count. If there are multiple search criteria, with some relative relationship among these search criteria, the resulting data search results may sometimes maintain the above relative relationship with other data search results. In such cases, each of the multiple Venn diagrams is displayed within the same region of the display, while maintaining the relative relationship with other Venn diagrams based on the search results.

Figure 2:
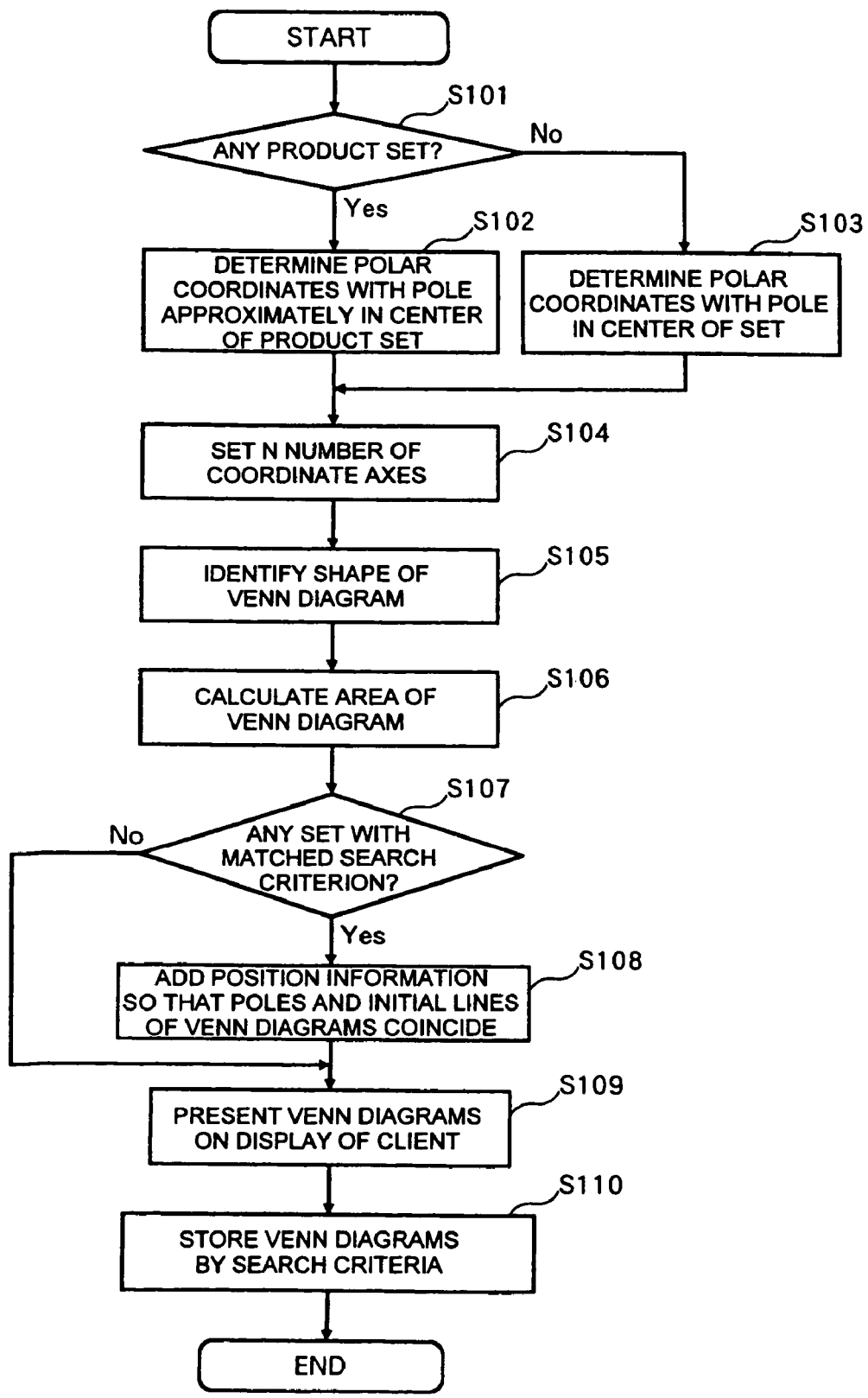
FIG. 2 is a flow diagram illustrating the procedures for displaying data search results.

This process is specifically performed in accordance with the procedures illustrated in FIG. 2. For the sake of simplicity of explanation, it is assumed that three sets, "Tokyo Residents" (total count of 300 hits), "Male" (total count of 1000 hits), and "Contract Years of Three or Longer" (total count of 800 hits) corresponding to the results of respective data searches based on three search criteria, "Address='Tokyo'", "Sex='Male'", and "Contract Years>=Three Years" for the customer data on a certain date are obtained as shown in FIG. 3(*a*).

In the example of FIG. 3(*a*), the left-hand side member is search criteria, while the right-hand side member is a data search result. For example, the top of the list indicates that for customers who are residents in Tokyo, not male, and have contract years of less than three years, there are 300 hits of data. Meanwhile, the bottom of the list indicates that for customers who are residents in Tokyo, male, and have contract years of three years or longer, there are 100 hits of data. The rest of the search criteria and data search results are also seen in a similar manner.

In the present embodiment, with attention paid to the product set that satisfies all the search criteria (in the example of FIG. 3(*a*), the bottom of the list, i.e., 100 hits), a polar coordinate system with its pole located in or near the center of the product set is defined (Step S101: Yes, S102). If there is no product set, that is, there is only a single set, a polar coordinate system with its pole located in the center of the set is defined (Step S101: No, S103). Thus, all the search criteria may be represented by polar coordinates having the pole of the polar coordinate system as their respective pole.

Once the pole of the polar coordinate system is defined, a plurality of coordinate axes passing across the pole are set (Step S104). The coordinate axes are set by segmenting 360 degrees by equal intervals of n. Then, an n-polygonal Venn diagram is represented by a combination of vertexes identified by the radius $\gamma i$ and argument $\theta i$ on each coordinate axis (Step S105). If there are multiple Venn diagrams, the relative relationship in position among the Venn diagrams is adjusted.

The greater the value of n, the greater the flexibility of the shape of an individual Venn diagram, so that the relative relationship with other Venn diagrams can be represented more accurately; however, the computational burden is increased accordingly; thus, an appropriate value should be set in consideration of the number of sets and the magnitude of an individual set. In the present embodiment, "12" is set as the value of n. In this case, the value of i for the radius $\gamma i$ and argument $\theta i$ of the polar coordinates ranges from 0 to 12. Note, however, that the initial line ($\gamma 0$, $\theta 0$) and end line ($\gamma n$, $\theta n$) assume the same value.

It will be appreciated that the value of n may be changed a posteriori. That is, if some of the sets have magnitudes that differ extremely from those of the rest, the relative relationship among the Venn diagrams may not sometimes be displayed properly at the same time, in which case by changing the value of n, adjustments can be made a posteriori so that they are easy to view.

The shape of the Venn diagram can be identified by repeating the convergent calculation for the radius $\gamma i$ that selectively uses any of the restricting parameters stored in the restrictions storage region (not shown) in the management server 20. This convergent calculation is an arithmetic operation such that the Venn diagram that represents the magnitude (numerical value) of an individual set is converged as a convex polygon; the process, which is preset as a routine, is activated upon entry of a restricting parameter, and automatically executed.

As restricting parameters, various types may be utilized. For example, assuming that a Venn diagram is displayed by a group of pixels on the display of the client 10 and in consideration of a rule of thumb that human visual perception recognizes more than a certain number of pixels, a condition where "a convergence point is such that the difference between the magnitude (actual value) of the set and the area (value obtained by drawing) is 10 pixels or less" may be used as one of the restricting parameters. A parameter for identifying the shape when drawn may also be used as one of the restrictions.

The convergent calculation is initiated under restricting parameters where the Venn diagram is converged to a convex polygon in a certain position, that is because a convex polygon makes it easier to understand the magnitude of a set due to human visual perception. However, although it is not always necessary to do so, a Venn diagram of concave polygonal shape may also be used. Typically, the convergent calculation is initiated under restricting parameters where it is converged to a convex polygon, and if it is not converged as a convex polygon after the convergent calculation is performed a predetermined number of times, the restricting parameters are switched by removing the restrictions one by one, so that a Venn diagram of concave polygonal shape appears.

Once the shape and position of the Venn diagram is determined by the convergent calculation, the area $Si$ of each Venn diagram is calculated (Step S106). When the set is represented by a dodecagonal Venn diagram by the afore-mentioned polar coordinate system, an individual Venn diagram itself is represented by a combination of twelve triangles. An overlap portion of product sets, if any, determined by a Boolean AND operation is also a dodecagon (a combination of triangles). This is self-evident in terms of algebraic geometry. Thus, the area calculation for Venn diagrams that are data search results can be simplified (sum of the areas of the triangles), and is therefore very convenient.

The area $Si$ may be specifically derived by performing arithmetic operation on the following equation. This equation suggests that the area of a dodecagon can be derived by summing the areas of the triangles determined by simple geometric calculation.

$$S = \frac{1}{2}\sin\frac{\pi}{6}\sum_{i=0}^{11} r_i r_{i+1} \qquad (2)$$

$$= \frac{1}{2} \cdot \frac{1}{2}\sum_{i=0}^{11} r_i r_{i+1}$$

$$= \frac{1}{4}\sum_{i=0}^{11} r_i r_{i+1}$$

The areas of product sets and remaining sets may also be derived as results of the convergent calculation for an increase or decrease in the radius γi.

When identifying the shape of the Venn diagram, the image processing section 23 confirms the search criteria corresponding to the respective Venn diagrams, and checks if there is any matched search criterion. If there is any matched search criterion, it adds to the Venn diagram the position information such that the poles of the Venn diagrams and their initial lines of the radius coincide with each other (Step S107: Yes, S108). The display control unit 24 performs control so that these Venn diagrams are presented on the display of the client 10 (Step S109). If there is no matched search criteria, it performs control so that the Venn diagrams are displayed with their position left unchanged (Step S107: No, S109).

Subsequently, each of the Venn diagrams is stored in the image storage unit 23 according to each of the search criteria, so that they will be read at any time in response to a display request from the client 10 (Step S110).

In this way, on the display of the client 10, three Venn diagrams are displayed within the same display region, while maintaining their relative relationship. That is, while maintaining the condition where the relative hit counts for male customers of 1000 hits, Tokyo resident customers of 700 hits, and over-three-contract-year customers of 800 hits are directly reflected, the relationship for the respective product sets (male customers who are residents in Tokyo: 100 hits; Tokyo resident customers who have contract years of 3 or longer: 200 hits; male customers who have contract years of 3 or longer: 300 hits; and male customers who are residents in Tokyo and have contract years of 3 or longer: 100 hits) is simultaneously presented on the display.

On the right-hand side in FIG. 3(b), there are shown date select buttons as an example of time-frame element. This indicates that for the same search criteria, data search results where only a temporal (time frame) element is different are stored in the image storage unit 23. When one of the buttons is selected from the client 10, the customers status on that date is presented under condition where the relative relationship in position of the Venn diagrams is maintained, that is, in the same coordinate system.

Figure 4:
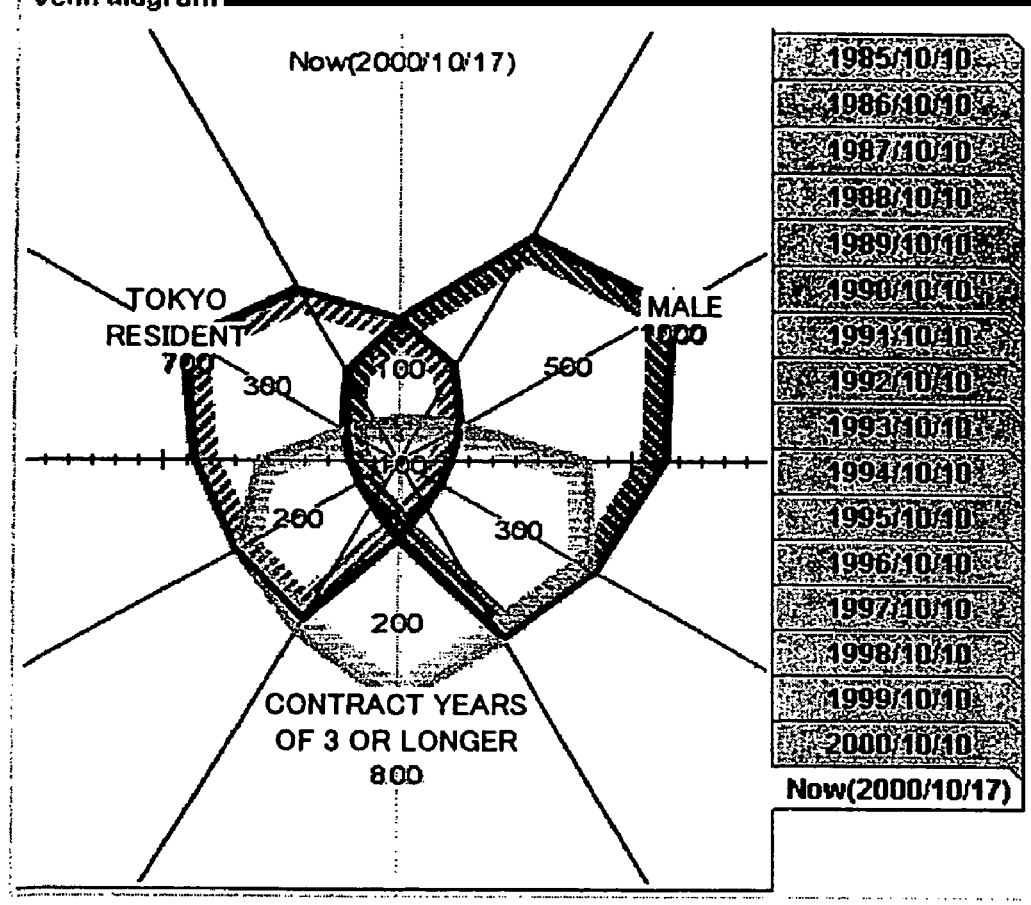
FIG. 4 depicts the Venn diagrams of FIG. 3(b), along with the actual count of hit data and the coordinate axes.

FIG. 4 depicts the three Venn diagrams shown in FIG. 3(b), along with the respective hit data count and the afore-described coordinate axes. It can be seen from this figure that each of the Venn diagrams, including portions overlapped by Boolean AND operation, is also represented by a combination of triangles. By allowing the data count to be displayed, the area of the Venn diagram permits you to intuitively understand the relative relationship with other Venn diagrams, while confirming the correct hit count.

Figures 6, 7:
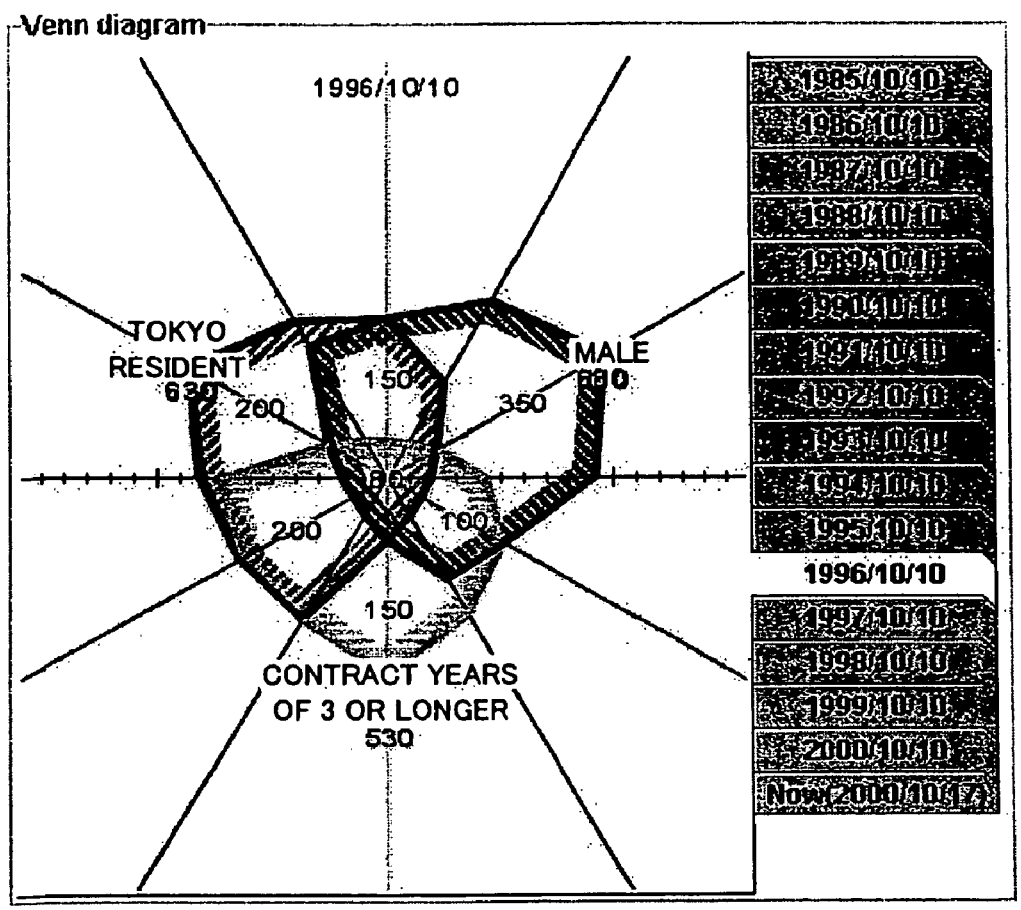
FIG. 6 depicts the Venn diagrams of FIG. 5(b), along with the actual count of hit data and the coordinate axes.
FIG. 7 depicts an example of Venn diagrams where product sets are simultaneously presented while maintaining their magnitude relationship.

FIG. 5(a) depicts the past data search results obtained by the same search criteria as in FIG. 3(a), and FIG. 5(b) depicts three Venn diagrams created and stored in a similar manner as in FIG. 3(b), with different time frames selected by the date select buttons located on the right-hand side of the figure. FIG. 6 depicts the Venn diagrams of FIG. 5(b), along with the count of hit data and the afore-described coordinate axes, where the status of customers on the date of Oct. 10, 1996 is presented.

It will be appreciated that Venn diagrams on all dates may not only be selectively presented in the same coordinate system as shown in FIG. 3(b) and FIG. 5(b), but Venn diagrams on different dates may also be presented side by side simultaneously in the same coordinate system. In the latter case, the Venn diagrams on individual dates stored in the image storage unit 23 may be presented in a regularly staggered manner, or simultaneously presented in reduced view.

In this way, with the database management system according to the present embodiment, the image processing unit 22 of the management server 20 represents the data search results as sets by search criteria, and converts each set to a dodecagonal Venn diagram having an area corresponding to the magnitude of element count of each set; and the display control unit 24 causes each of the Venn diagrams to be displayed within the same display region, while maintaining the relative relationship with other Venn diagrams based on the search criteria. As such, the human operator who manipulates the client 10 can intuitively understand the data search results.

Figure 8:
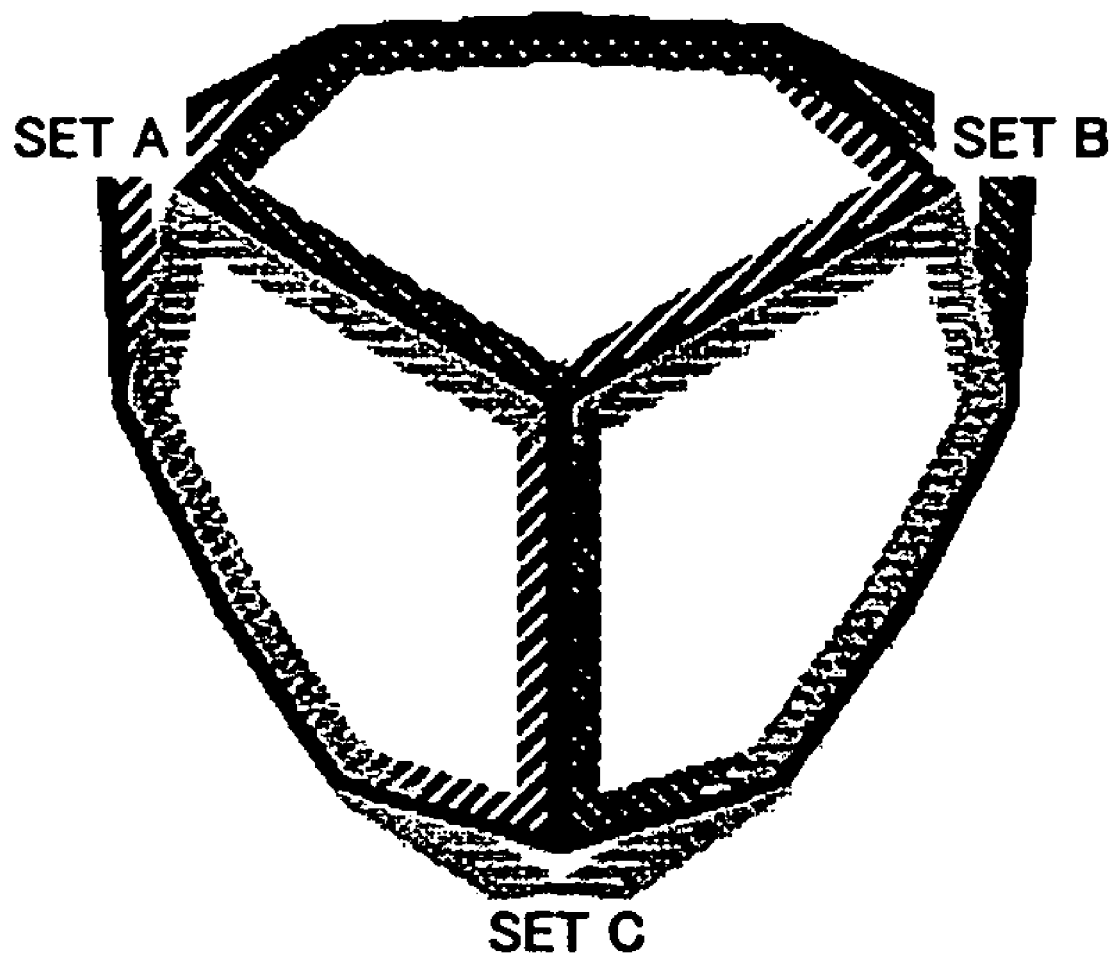
FIG. 8 depicts an example of certain search criteria and their data search results.

Furthermore, because the image processing unit 22 permits the number of vertexes (angles) of the Venn diagram to be appropriately changed a posteriori, various display formats for data search results can be achieved, which could not otherwise be realized. For example, FIG. 7 shows an example where the search criteria and data search results shown in FIG. 8 are presented on the display of the client 10, while maintaining the relationship in magnitude of the product sets. Such Venn diagrams could not be expressed with prior art methods that represented Venn diagrams by use of rectangles or circles.

In the present embodiment, a description has been given using a network-based database management system by way of example, although the present invention is not limited to such network types, but implemented as a stand-alone system. In that case, the display means, which corresponds to the display of the client 10, is a display device that comes standard with the stand-alone system.

Networks, if used, are not limited to the Internet, but a local network, such as the intranet, may also be applicable.

In the present embodiment, a description has been given using a dodecagonal Venn diagram as an n-polygonal image by way of example, although the present invention may be implemented with any shape of image that visually represents data search results for multiple search criteria and permits relative comparison among the respective results, so it is not necessarily restricted to Venn diagrams as in the present embodiment.

As is clear from the above description, according to the present invention, a set that is a result of data search is represented as an n-polygonal image having an area corresponding to its magnitude, so that an easy-to-understand user interface for human operators can be realized.

It should be understood that the invention is not limited to the exact embodiment or construction that has been illustrated and described but that various changes may be made without departing from the spirit and the scope of the invention.

What is claimed is:

1. A data search system comprising:
    a data acquisition means for acquiring results of a data search based on certain search criteria;
    an image processing means for representing, as a set for each of said search criteria, the results of said data search acquired by said data acquisition means and converting each set to an n-polygonal image, where n is a natural number, and having an area corresponding to the magnitude of element count of each set, wherein said image processing means derives said n-polygonal image by repeating a convergent calculation for drawing under certain restricting parameters, wherein said convergent calculation is initiated under restricting parameters where a convex polygon appears, and if said convergence does not appear as a convex polygon after repeating a certain number of times, the restricting parameters are switched so that a concave polygon appears; and a display control means for causing each n-polygonal image converted by said image processing means to be displayed on a predetermined display device, wherein each of said multiple n-polygonal images is displayed within the same display region while maintaining a relative relationship with other n-polygonal images based on said search criteria.

2. A data search system according to claim 1, wherein said image processing means converts each of said sets to an n-polygonal image having an area corresponding to the magnitude of element count of each of said sets and a relative relationship in position based on said search criteria.

3. A data search system according to claim 1, wherein said image processing means represents the data search result obtained by a Boolean AND operation of said search criteria as an overlap of the n-polygonal images converted from the respective sets of said search criteria.

4. A data search system according to claim 1, wherein said image processing means identifies the shape of said n-polygonal image by a radius and argument of its polar coordinates, and calculates the area of said n-polygonal image by an operational expression having said radius and n as its variables.

5. A data search system according to claim 4, wherein when multiple sets of said search criteria contain any product set determined by a Boolean AND operation, said image processing means derives the area of said product set as a result of convergent calculation for an increase or decrease in said radius.

6. A data search system according to claim 1, further comprising:

an image storage means for storing said n-polygonal image converted as the data search results, where only a portion of said search criteria differs, according to said search criteria that are commonly shared by the rest of said search criteria, wherein said image processing means causes multiple n-polygonal images that vary with changes in a portion of said search criteria to be displayed within the same display region of said display device.

7. A data search system according to claim 6, wherein when the shape of said n-polygonal image is identified by a radius and argument of its polar coordinates and the area of said n-polygonal image is calculated by an operational expression having said radius and n as its variables, said image processing means places in the same position the poles of said polar coordinates and their initial lines for a plurality of n-polygonal images displayed within said same display region.

8. A data search system according to claim 1, wherein said n-polygonal image is used as a Venn diagram image.

9. A data search system according to claim 8, further comprising:

a means for changing the value of n for said n-polygonal image a posteriori.

10. A method for displaying a data search result comprising the steps of:

representing a result of a data search based on certain search criteria as a set according to each of said search criteria;

converting each of said sets to an n-polygonal image having an area corresponding to the magnitude of element count of each of said sets and a relative relationship in position among said search criteria, wherein converting each of said sets to an n-polygonal image comprises repeating a convergent calculation for drawing under certain restricting parameters, wherein said convergent calculation is initiated under restricting parameters where a convex polygon appears, and if said convergence does not appear as a convex polygon after repeating a certain number of times, the restricting parameters are switched so that a concave polygon appears; and displaying each converted n-polygonal image on a predetermined display device, wherein each of the multiple n-polygonal images is displayed within the same display region while maintaining a relative relationship with other n-polygonal images based on said search criteria.

11. A method for displaying a data search result according to claim 10, and further comprising the steps of:

obtaining each of said n-polygonal images under a plurality of search criteria where only a time-frame element is different is stored; and simultaneously displaying said n-polygonal images at all time frames in the same coordinate system on said display device.

12. A method for displaying a data search result according to claim 10, and further comprising the steps of:

obtaining each of said n-polygonal images under a plurality of search criteria where only a time-frame element is different is stored; and simultaneously displaying said n-polygonal images at different time frames in the same coordinate system on said display device.

13. A computer program in a computer that conducts a data search based on certain search criteria, said computer comprising;

a data acquisition means for acquiring results of data search based on said search criteria;

an image processing means for representing said search results acquired by said data acquisition means as sets according to each of said search criteria and converting each of said sets to an n-polygonal image where n is a natural number, and having an area corresponding to the magnitude of element count of each of said sets, wherein said image processing means derives said n-polygonal image by repeating a convergent calculation for drawing under certain restricting parameters, wherein said convergent calculation is initiated under restricting parameters where a convex polygon appears, and if said convergence does not appear as a convex polygon after repeating a certain number of times, the restricting parameters are switched so that a concave polygon appears; and a display control means for causing a predetermined display device to display each of said n-polygonal images converted by said image processing means, wherein said computer program causes each of said multiple n-polygonal images to be displayed within the same display region on said display device while maintaining a relative relationship with other n-polygonal images based on said search criteria.

14. A computer program according to claim 13, further comprising a computer-readable storage medium for storing said computer program.

* * * * *